United States Patent

Goller

[15] 3,640,685

[45] Feb. 8, 1972

[54] METHOD OF PRODUCING FLUOSILICIC ACID OF LOW PHOSPHORUS CONTENT FROM WASTE GASES

[72] Inventor: Heinz Goller, Linz am Danube, Austria

[73] Assignee: Osterreichische Stickstoffwerke Aktiengesellschaft, Linz am Danube, Austria

[22] Filed: Apr. 6, 1970

[21] Appl. No.: 26,165

[30] Foreign Application Priority Data

Apr. 8, 1969  Austria ............................... A 3370/69

[52] U.S. Cl. .................................... 23/153, 23/88, 23/205
[51] Int. Cl. ................... C01b 7/00, C01b 33/08, C01b 7/22
[58] Field of Search ........................... 23/153, 88, 205, 182

[56] References Cited

UNITED STATES PATENTS

| | | | |
|---|---|---|---|
| 3,111,384 | 11/1963 | Heckathorn et al. | 23/153 X |
| 3,246,977 | 4/1966 | Hinkle, Jr. | 23/153 X |
| 2,369,791 | 2/1945 | Moore | 23/88 |
| 3,219,410 | 11/1965 | Dexter | 23/153 |
| 3,024,086 | 3/1962 | Cines | 23/153 X |

Primary Examiner—Edward Stern
Attorney—Wenderoth, Lind & Ponack

[57] ABSTRACT

The hot waste gases obtained from crude phosphate digestion in the manufacture of superphosphate were diluted with eight to 12 times their volume of air and the sludge droplets and the crude phosphate dust were then separated in a cyclon with a limiting particle size of at most 0.01 mm. before eluting the $H_2SiF_6$ with water.

2 Claims, No Drawings

METHOD OF PRODUCING FLUOSILICIC ACID OF LOW PHOSPHORUS CONTENT FROM WASTE GASES

This invention relates to a simplified process for obtaining crude fluosilicic acid of particularly low phosphorus content from the waste gases obtained from the digestion of crude phosphate when manufacturing superphosphate.

The gases produced on digesting crude phosphate with sulphuric acid inter alia contain, depending on the variety of crude phosphate, about 20 g./m.³ of fluorine in the form of HF and $SiF_4$. The toxicity of both compounds in itself demands careful purification of the waste gases. Furthermore, the waste gases from a valuable raw material source for obtaining fluorine compounds.

The HF and the $SiF_4$ are easily separated out by washing the waste gases with water in a suitable washer, whereby an aqueous solution of fluosilicic acid (silicofluoric acid) is formed:

$$2HF + SiF_4 + aq \rightarrow H_2SiF_6 \cdot aq$$

This fluosilicic acid can be further processed in a known manner, for example to give sodium silicofluoride, aluminum fluoride or cryolite, $Na_3AlF_6$.

The crude fluosilicic acid obtained in this way contains about 2.5 percent of $P_2O_5$, relative to $\phi$percent strength $H_2SiF_6$. The $P_2O_5$ originates from the sludge droplets of the material being digested and from the crude phosphate dust, which are carried by the resulting gas into the washer. Such a high $P_2O_5$ content interferes significantly with the further processing of both the fluosilicic acid and its subsequent products and must therefore be removed or, better still, be avoided from the start.

It has been found that condensation very simply can be avoided by diluting the waste gases, before entering the cyclone, which may possess a limiting particle size of at most 0.01 mm., with air to the point that the temperature under no circumstances falls below their dew point. Experience has shown that this requires a dilution of the waste gases with 8 to 12 times their volume of air. The subsequent elution of the $H_2SiF_6$ is not impaired thereby.

Accordingly the present invention provides a process for producing fluosilicic acid of particularly low phosphorus content from the wastegases obtained from crude phosphate digestion in the manufacture of superphosphate which process comprises diluting the waste gases from the digestion vessel for the crude phosphate, which are at a temperature of 90° to 100° C. with 8 to 12 times their volume of air, separating the sludge droplets and the crude phosphate dust in a cyclone with a limiting particle size of at most 01 mm., calculated according to the formula set out herein and subsequently eluting the $H_2SiF_6$ with water.

The original amount of the waste gases is to be calculated from the water vapor pressure above the sulphuric acid used for the digestion, with an addition for HF and $SiF_4$.

The limiting particle size is to be calculated according to the formula of Rosin, Rammler and Intelmann (z.VDI, 76(1932), 433/437):

$$X_{min} = \sqrt{\frac{\eta}{\pi \rho \bar{w}}} \sqrt{s(1-s/D)}$$

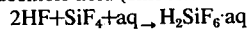

| | |
|---|---|
| $x_{min}$ | the diameter of the smallest particle which is still separated out, measured in meters. |
| $\eta$ | the dynamic viscosity of the carrier gas (for practical purposes that of air at the given temperature) in kg./m.sec. |
| $\pi$ | 3.1416 |
| $\rho$ | the density of the dust and of the droplets in kg./m.³ |
| $\bar{w}$ | the mean speed of entry of the carrier gas into the cyclone in m./sec. |
| $s$ | the distance of the dip tube from the outer wall of the cyclone in meters |
| $D$ | the diameter of the cyclone in meters. |

Cyclones of the type of the VAN TONGEREN separator have proved particularly suitable.

The sludge droplets separated off in the cyclone and the crude phosphate dust are continuously or discontinuously flushed back into the digestion vessel with the aid of water.

The following Example illustrates the invention and the manner in which it may be performed.

EXAMPLE

Waste gases issuing at a temperature of 94° C. and in an amount of 900 to 1,000 m.³/hour from a crude phosphate digestion vessel with an output of about 28 tons/hour of superphosphate under the customary digestion conditions, gave 690 kg. of fluosilicic acid containing 22 percent by weight of $H_2SiFhd 6$ on absorption by water; this acid contained 5 g./1 of $P_2O_5$.

After passing through a cyclone (twin cyclone of the type of the VAN TONGEREN separator) of 1.14 m. diameter and dilution of the waste gases with 10,000 m.³/hour of air, an acid of the above concentration which contained only 35 mg./1 of $P_2O_5$ was produced under otherwise identical working conditions.

The residue separated off in the cyclone was continuously returned to the digestion vessel together with 180 l./h. of water.

What we claim is:

1. A process for producing fluosilicic acid from the waste gases obtained from the crude phosphate digestion in the manufacture of superphosphate, which process comprises diluting the waste gases evolved from the digestion of the crude phosphate, which waste gases contain HF, $SiF_4$ and sludge droplets of the material being digested and crude phosphate dust, which gases are at a temperature of 90° to 100° C., with 8 to 12 times by volume of air per volume of the waste gases, separating the sludge droplets and crude phosphate dust by passing said diluted waste gases into a cyclone having a limiting size of at most 0.01 mm. and subsequently eluting the resulting waste gases with water to form fluosilicic acid, whereby said limiting particle size is calculated by $$X_{min} = 3\sqrt{\frac{\eta}{\pi P \bar{w}}} \cdot \sqrt{S(1-S/D)},$$

in which

| | | |
|---|---|---|
| $X_{min}$ | = | limiting particle size; is defined as the diameter of the smallest particle which is still separated out, given in meters |
| $\eta$ | | is the dynamic viscosity of air at given temperature in kg./m.sec. |
| $P$ | | is the density of the dust and of the droplets in kg./m.³ |
| $\bar{w}$ | | is the mean speed of entry of the carrier gas into the cyclone in m./sec. |
| $S$ | | is the distance of the dip tube from the outer wall of the cyclone in meters and |
| $D$ | | is the diameter of the cyclone in meters. |

2. A process according to claim 1 in which the cyclone is rinsed with water in order to remove the sludge droplets and the crude phosphate dust which are separated and the resulting suspension is returned to the digestion vessel.

* * * * *